UNITED STATES PATENT OFFICE.

A. K. EATON, OF NEW YORK, N. Y.

TREATMENT OF INDIA-RUBBER.

Specification of Letters Patent No. 28,744, dated June 19, 1860.

*To all whom it may concern:*

Be it known that I, A. K. EATON, of New York, in the county of New York and State of New York, have invented a new and useful Method of Manufacturing India-Rubber Goods; and I do hereby declare that the following is a full and exact description thereof.

The nature of my invention consists in the combination of the oxid of aluminum or pure alumina with caoutchouc and sulfur, or with gutta percha and sulfur; or its combination with any other agent than sulfur that will affect or influence the curing of those gums.

Pure alumina is most cheaply produced by the ignition of the sulfate of alumina. When made from a pure sulfate, by this method, it is exceedingly white and remarkable for its lightness; and is unaffected by most chemical agencies. It is scarcely attacked by the strongest acids. These properties render it of great value as an agent in the preparation of india-rubber or gutta percha fabrics. Alumina may also be produced by the ignition of the double sulfate of alumina and ammonia, or by precipitation from the ordinary alums.

The proportion of alumina to be used in the preparation of the rubber compound will vary according to the nature of the article to be manufactured therefrom. The ordinary formula is as follows:

Caoutchouc_____ 40 per cent.
Oxid of aluminum_____ 55 " "
Sulfur or its equivalent_____ 5 " "

In some cases a portion of the oxid of aluminum may be replaced by pure silicate of alumina or by a small portion of coloring matter. This compound being submitted to a gradually elevated temperature for several hours, either in a metallic or a saline bath, or in a closed chamber filled with steam under high pressure, assumes the well known characteristics of vulcanized india-rubber.

The advantages arising from this new combination are as follows: The very low specific gravity of the oxid of aluminum enables us to manufacture fabrics,—clothing for example,—of much less weight than by the use of any of the ordinary metallic oxids or carbonates. The extreme whiteness of pure alumina and the impossibility of rendering it darker by the action of sulfur or heat fits it for the manufacture of white or delicately tinted goods. The extremely low heat conducting power of alumina peculiarly adapts it to the manafacture of india rubber clothing of all kinds. It possesses drying qualities and prevents the tendency to become sticky.

I disclaim the various silicates of alumina, such having been heretofore used. I do not claim the particular mode of vulcanizing patented by Charles Goodyear, the use of sulfur having become the common property of the public by the expiration of the patent of Nathaniel Hayward.

What I claim as my invention and desire to secure by Letters Patent of the United States is:

The combination of oxid of aluminum with sulfur and caoutchouc or allied gums; and the treatment of the compound in the manner substantially as herein specified.

A. K. EATON.

Witnesses:
  DANIEL BREED,
  G. BREED.